United States Patent

[11] 3,564,284

[72] Inventor Bruce H. Kamens
 56 Hotchkiss Ave., Thomaston, Conn. 06787
[21] Appl. No. 799,368
[22] Filed Feb. 14, 1969
[45] Patented Feb. 16, 1971

[54] TIME INTERVAL COMPARISON SYSTEM
 11 Claims, 5 Drawing Figs.
[52] U.S. Cl.................................................. 307/232,
 307/293, 307/295; 328/134, 328/129
[51] Int. Cl............................................... H03k 5/20
[50] Field of Search............................................ 307/232,
 233, 293, 295; 328/133, 134, 141, 155, 129—131;
 329/126; 324/83 (D), 68 (C)

[56] References Cited
 UNITED STATES PATENTS
| | | | |
|---|---|---|---|
| 2,897,363 | 7/1959 | Gorgas............................ | 328/133 |
| 3,296,525 | 1/1967 | Sakuma.......................... | 307/232X |
| 3,349,400 | 10/1967 | Asher et al..................... | 324/83X |

Primary Examiner—Stanley D. Miller, Jr.
Attorney—Donald P. Gillette

ABSTRACT: Apparatus for comparing a recorded, standard interval of time with subsequent intervals of time and determining whether such subsequent intervals are equal to the standard interval to within a predetermined degree of accuracy measured as a fraction of the standard interval. The invention includes means to record a standard interval of time as an electrical condition, means to record a subsequent interval of time as a second electrical condition, and time-controlled means to compare the two conditions to determine which is the longer and by how much. One embodiment of the invention includes a timing circuit with a digitally controlled time constant to indicate the discrepancy between a subsequent interval and the standard interval for different standard intervals. Another embodiment uses an additional time recorder to make a direct comparison between the record of the standard interval and a record of the discrepancy interval.

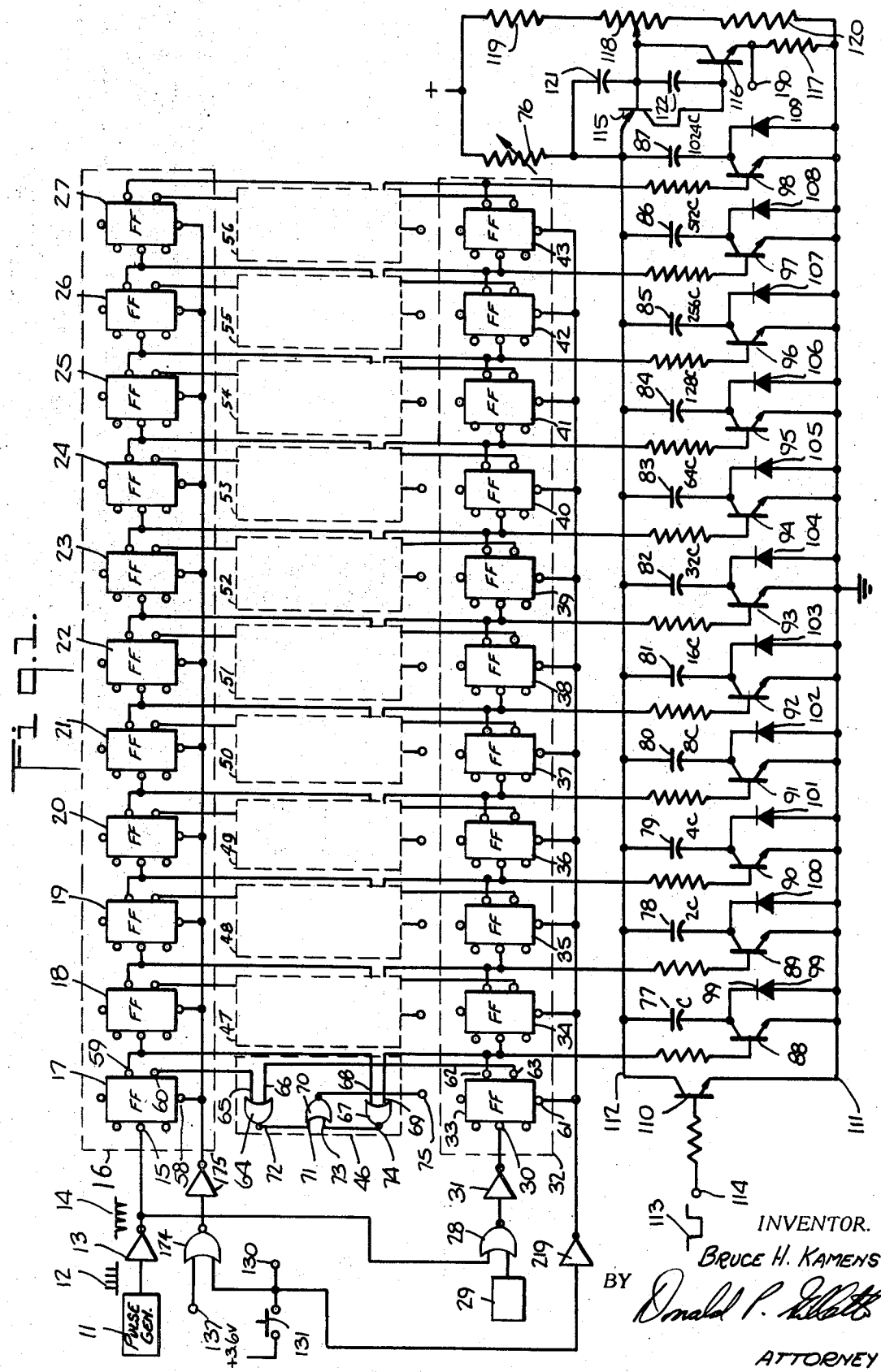

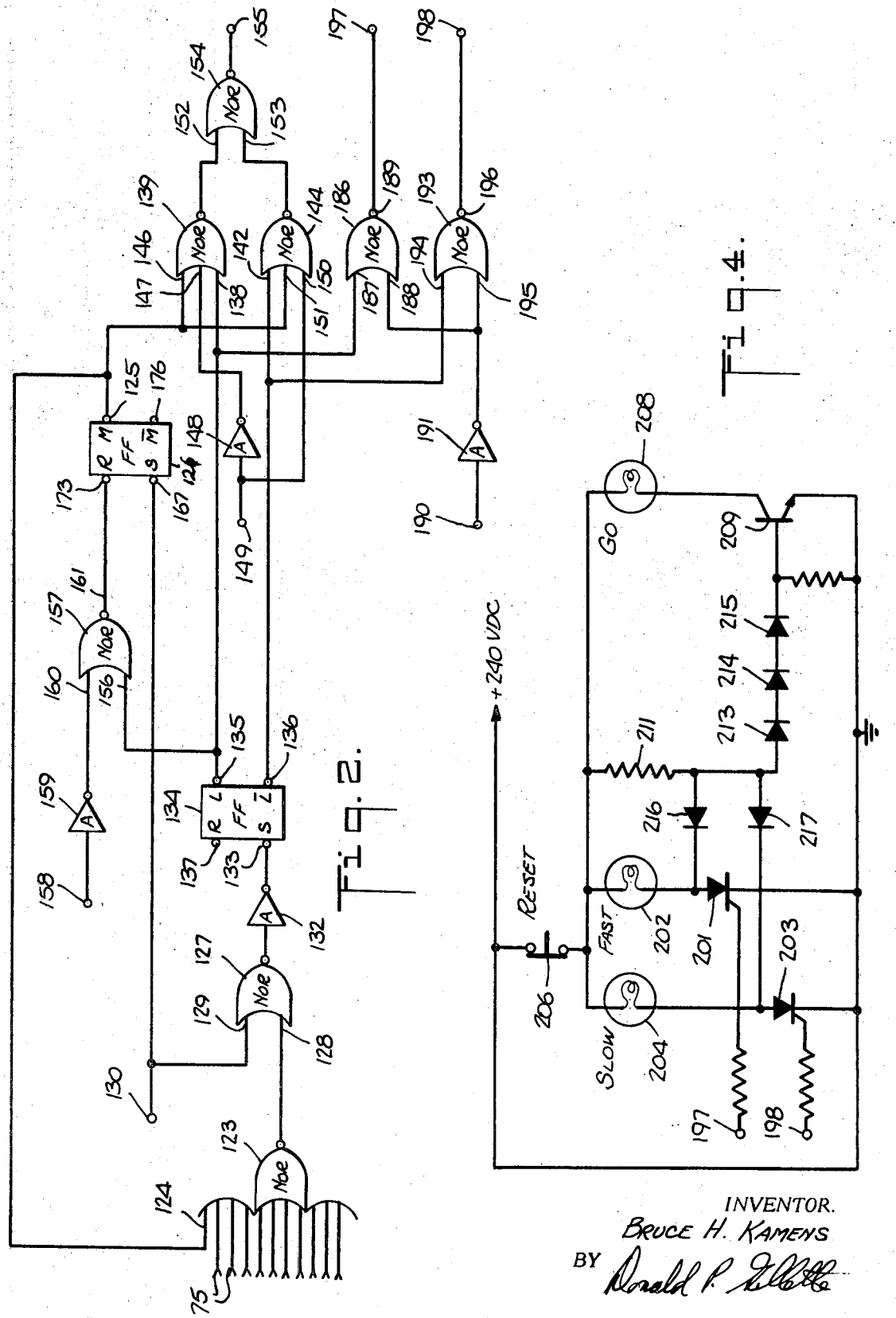

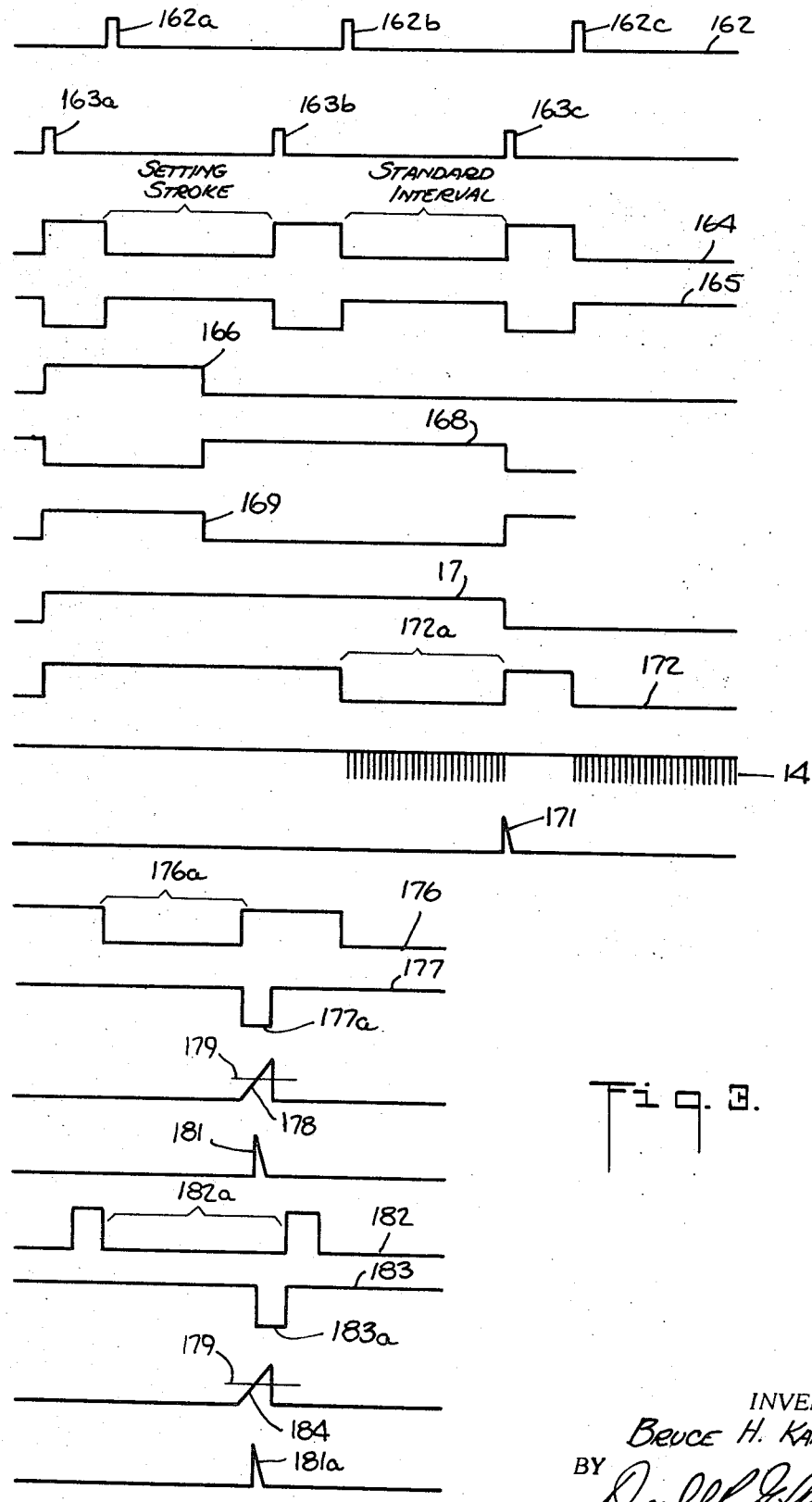

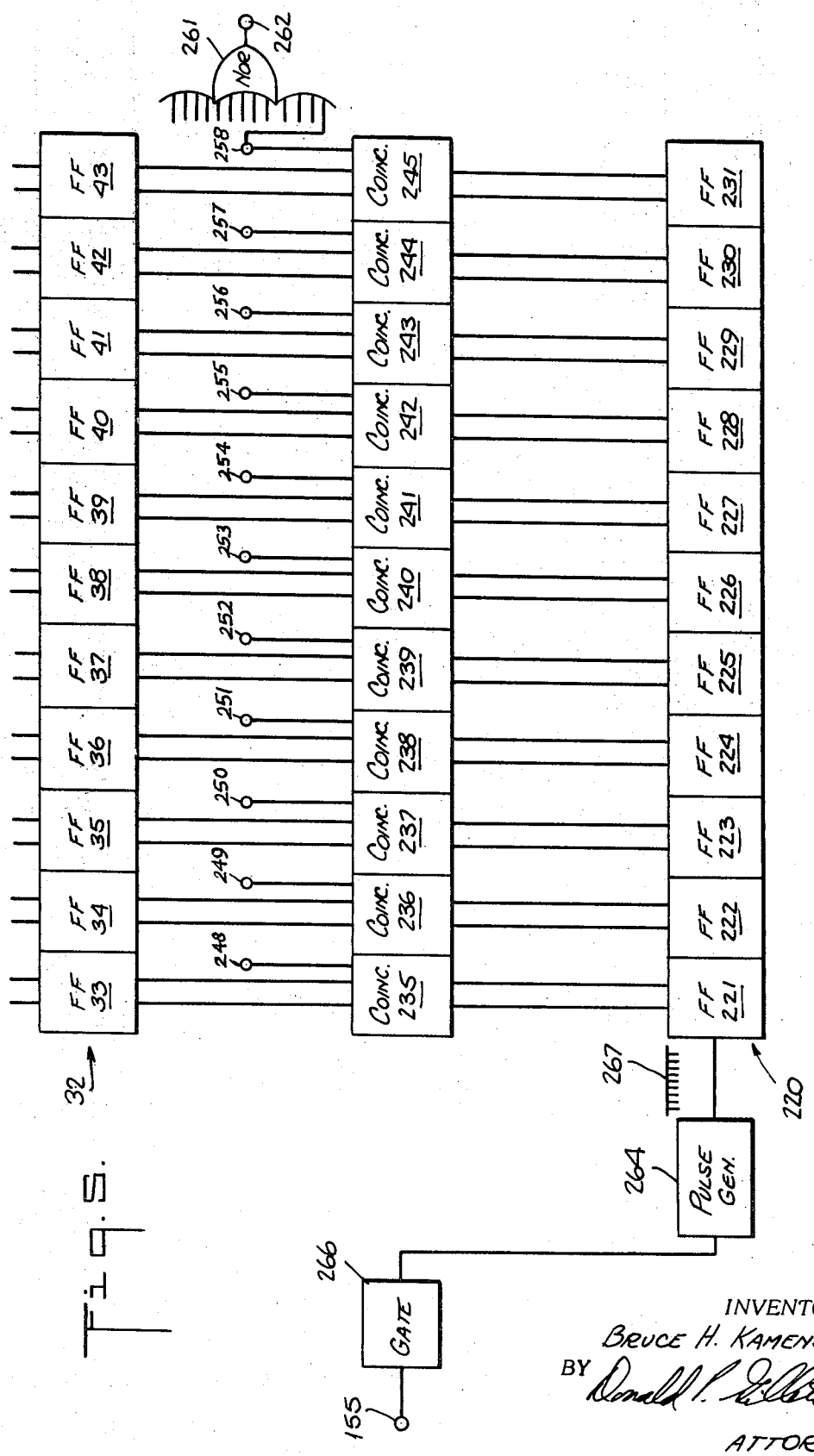

TIME INTERVAL COMPARISON SYSTEM

This invention relates to electrical timing apparatus and particularly to apparatus for measuring an interval of time and determining the amount by which it differs from a standard interval in terms expressed as a fraction of the standard interval.

In the measurement of physical data where a certain event is supposed to occur within a certain predetermined interval of time in order, for example, to maintain the quality of a manufactured product at a satisfactory level, it is sometimes sufficient, and even desirable, merely to determine how long it took the event to occur and to compare this length of time with a standard length of time that the event was supposed to take, instead of making a direct, possibly destructive analysis of the quality of the product. The difference between the time actually taken and the standard interval of time supposed to have been taken may then be compared with the standard interval to express the difference as a fraction of the standard interval. If the standard interval is known, the calculation of the fraction may not be difficult, but if the standard interval is arbitrarily chosen and differs from time to time, the calculation of the fraction becomes more complicated.

Time can be recorded in an electrical circuit in terms of a voltage or current that begins at a predetermined level and changes in a predetermined way, for example, by increasing linearly, throughout the interval to be measured. The final value of the voltage or current is then, ideally, a function only of time as the sole variable, but in fact the final value of the voltage or current is also affected by other factors that should be constant but may actually be variables, such as the initial value and the circuit parameters that determine the rate of change. It is preferable, therefore, to record an interval of time, and particularly a standard interval to which reference may be made again and again, as a circuit condition that, as nearly as possible, depends only on time. A shift register that steps in uniform increments in response to pulses of fixed repetition rate is such a circuit since the accuracy of the recorded time depends almost exclusively on the accuracy of the pulse generator. By using the same pulse generator to record a standard interval on one shift register and to record a subsequent interval on a second, similar shift register, and by comparing the final conditions of the two shift registers, the accuracy of comparison is increased still more and is then subject only to the drift error of the pulse generator.

The circuit condition of a shift register that consists of a chain of flip-flop circuits is identified by the state of conductivity of the flip-flops. A flip-flop is a circuit having two stable states of conductivity, and at any time it will be either in its first state or its second state. An actuating pulse of the proper polarity applied to actuating signal input terminals will cause the flip-flop to change from its first to its second state, and the next actuating pulse will cause it to change back to its first state. By using the pulse derived from each flip-flop as it changes from its second to its first state as the actuating signal for the next flip-flop in the chain, and by providing a chain having a sufficiently large number of flip-flops, any desired interval may be recorded, and identified, in terms of whether each individual flip-flop in the chain is in its first or its second state of conductivity.

In the language of logic as applied to such circuits, the first state may be identified as a 1, or a condition in which the output of a particular section of the flip-flop is "high," and the second state may be identified as a 0, or a condition in which the output is "low." The identifications are, to some extent, arbitrarily selected, but one applied to a given circuit must be followed in setting up the complete system. Thus, the record of an interval of time may be a series of 1's and 0's along a chain of flip-flops or along a chain of whatever elements make up the shift register. Because of the fact that the elements of the shift register are stable in either state, the record of the interval of time may be retained as long as desired and thus be available for subsequent comparison.

The invention uses a second shift register to record subsequent intervals of time as a series of 1's and 0's and a series of coincidence circuits to compare the state of each element of the first shift register with a corresponding element of the second shift register. If the two shift registers have identical series of 1's and 0's, the subsequent interval of time is the same as the standard interval, and this information may be utilized in any desired way, after which the second shift register may be brought back to its original condition to await a signal to record yet another interval of time.

The invention includes means to determine how great the discrepancy is between the subsequent interval and the standard interval in those cases in which there is a discrepancy. One embodiment for doing this utilizes a sawtooth wave generator, or timing circuit having time constant elements or impedances controlled by the shift register that measures the standard interval. A long standard interval would result in one time constant; a shorter standard interval would result in a different time constant. For a period of time equal to the discrepancy the timing circuit is energized and continuously increasing signal is produced by it. An indicator, which may include a trigger circuit, is set at a certain value of signal level, which is arbitrarily chosen to correspond to a predetermined fraction of the standard interval. The uniformly increasing signal is applied to the indicator and the indicator is so arranged as to be actuated if the discrepancy period is equal to or greater than the predetermined fraction of the standard interval. Further circuits may be included to show whether the subsequent interval is shorter or longer than the standard interval.

Another way of indication whether or not the discrepancy interval exceeds a predetermined fraction of the standard interval is to provide a third shift register and a second set of coincidence circuits that measures, element by element, the coincidence circuits that measures, element by element, the coincidence of the elements of the third shift register with those of the first shift register. For a period of time equal to the discrepancy interval the third shift register is energized with pulses having a repetition rate that is a known multiple of the repetition rate of the pulse signal that energized the first shift register. For example, if the third shift register is energized with pulses that have a repetition rate 100 times the repetition rate of the pulses that energized the first shift register, and if, during the discrepancy interval, coincidence is achieved between each element of the first shift register and the corresponding element of the third shift register, it will be because the discrepancy interval is at least 1 percent of the standard interval. If the repetition rate of pulses applied to the third shift register is only ten times that of the pulses applied to the first shift register, coincidence during the discrepancy interval will indicate that the discrepancy is at least 10 percent of the standard interval. In general, coincidence during the discrepancy interval when the third shift register is actuated by pulses having a repetition rate N times that of the pulses applied to the first shift register will indicate that the discrepancy interval is at least equal to 1/N times the standard interval.

The invention also includes means to control the actuation of the shift registers and to start the measurement of the discrepancy interval, either at the end of the subsequent interval or at a time after the beginning of the subsequent interval equal to the standard interval, whichever occurs first. If the subsequent interval is shorter than the standard interval, the discrepancy interval will start with the end of the subsequent interval and will terminate at a time corresponding to the end of the standard interval, but if the subsequent interval is longer that the standard interval the discrepancy interval will start at a time corresponding to the end of the standard interval and will terminate at the end of the subsequent interval.

The invention will be described in greater detail in the following specification together with the drawings in which:

FIG. 1 is a circuit diagram, partially in schematic and partially in block logic form, of shift registers, coincidence circuits, and a timing circuit in a timing system according to the invention;

FIG. 2 is a block diagram of logic circuits connected to control and to utilize information in conjunction with the circuit in FIG. 1;

FIG. 3 is a timing diagram of pulse signals produced in the operation of the circuits in FIGS. 1 and 2;

FIG. 4 is a schematic diagram of a circuit for indicating whether a particular interval of time measured by the circuits of FIGS. 1 and 2 has substantially the same length as a standard interval or is shorter or longer than the standard interval; and FIG. 5 is a block diagram of a modified portion of the circuit in FIG. 1.

The circuit in FIG. 1 comprises a pulse oscillator 11 that produces a pulse signal 12 having a predetermined repetition rate. The oscillator 11 is connected to an amplifier 13, the output signal 14 of which corresponds to an inverted replica of the pulse signal 12. The amplifier 13 is connected to the toggle input terminal 15 of the shift register 16 that comprises a series of flip-flops 17—27. The amplifier 13 is also connected to a NOR gate 28 which receives a second signal from a source 29 to be described hereinafter. The output of the NOR gate 28 is connected to an amplifier 31 and from there to the toggle input 30 of a shift register 32 that comprises a chain of flip-flops 33—43. To distinguish the two shift registers, the shift register 32 may be referred to as a storage register in which information is stored as to the length of the standard interval of time and the shift register 16 may be referred to as a counter, or counter-timer, in which information is stored as to the duration of a subsequent interval of time to be compared with the standard interval.

A set of coincidence circuits 46—56 is connected to the counter 16 and to the storage register 32 so that each element of the counter and a corresponding element of the storage register is connected to a specific one of the coincidence circuits.

The illustrations of the flip-flops in both the counter and the storage register are conventional, and all of them can be identical. In addition to the toggle input terminal 15, each flip-flop has a reset terminal, and first and second output terminals converse to each other. The reset terminal for the flip-flop 17 is indicated by reference numeral 58 and the output terminals of the flip-flop 17 are indicated by reference numerals 59—60. The reset terminal of the flip-flop 33 is indicated by reference numeral 61, and the output terminals of the flip-flop 33 are indicated by reference numerals 62 and 63, respectively. The signal at the terminal 62 is always the converse of the signal at the terminal 63; i.e. when the signal at the terminal 62 is high, that at terminal 63 is low, and vice versa.

Each of the identical coincidence circuits 46—56 comprises three NOR gates, but only the coincidence circuit 46 that connects the flip-flops 17 and 33 is shown in detail. This circuit comprises a first NOR gate 64 having a first input terminal 65 connected to one output terminal 60 of the flip-flop 17 and a second input terminal 66 connected to one output terminal 63 of the flip-flop 33. The coincidence circuit also includes a second NOR gate 67 having a first input terminal 68 connected to the output terminal 59 and a second input terminal 69 connected to the converse output terminal 62. The third NOR gate 70 in the coincidence circuit 46 has a first input terminal 71 connected to the output terminal 72 of the NOR gate 64 and a second input terminal 73 connected to the output terminal 74 of the NOR gate 67. The output terminal 75 of the NOR gate is also the output terminal of the first coincidence circuit 46.

The means shown in FIG. 1 for comparing a discrepancy interval with the standard interval to determine whether or not the discrepancy is larger than a predetermined fraction of the standard interval includes a circuit for generating a continuously increasing voltage in the nature of a sawtooth wave. This circuit includes an impedance 76, which, in the present embodiment, is a resistor, which is adjustable to set the tolerance to a desired value, and a group of capacitors 77—87 that may be switched into operative connection with the resistor 76 by a corresponding group of individual transistor switches 88—98. The base electrode of each of the transistors 88—98 is connected to one output terminal of the flip-flops 33—43, respectively, to connect selected ones of the capacitors 77—87 in operative series connection with the resistor 76 depending on which of the flip-flops 33—43 are in their "1" state, i.e. the state that applies a voltage to corresponding ones of the transistors 88—98 to render them conductive. The resistor 76 and the operative ones of the capacitors 77—87 constitute the time constant parameters of the timing circuit.

Separate diodes 99—109 are connected directly in parallel with the emitter-collector output circuit of the transistors 88—98, respectively, and are polarized to provide quick discharge of any of the capacitors 77—87 that may be charged in the operation of the circuit. A control transistor 110 is connected between the common terminal 111 and a line 112, which is the common junction of the resistor 76 with all of the capacitors 77—87. The transistor 110 is controlled by a signal 113 applied to the input terminal 114 to make the transistor nonconductive for the duration of this signal and allow the operative ones of the capacitors 77—87 to charge through the resistor 76 at a rate determined by the time constant of this timing circuit.

A trigger circuit comprising a pair of transistors 115 and 116 is connected in parallel with the output circuit of the transistor 110 and in parallel with the capacitors 77—87 and the switching transistors 88—98 to be triggered when the voltage on the line 112 reaches a certain level. The transistors 115 and 116 are arranged so that the collector electrode of each is directly connected to the base electrode of the other, and a load impedance 117 is connected in series with the emitter electrode of the transistor 116. The voltage at which the trigger circuit will be actuated is the voltage determined by the setting of the arm of the potentiometer 118 which, together with two resistors 119 and 120, forms a voltage divider. Until the voltage on the line 112 reaches the voltage on the arm of the potentiometer 118, both transistors 115 and 116 are nonconductive, but as soon as the voltages are equal, or substantially so, the trigger circuit will be actuated. A first noise-reducing capacitor 121 is connected from the emitter to the base of the transistor 112 and a second small noise-reducing capacitor 112 is connected between the collector and the base of both of the transistors 115 and 116.

The logic circuit that controls the operation of the circuit in FIG. 1 is shown in FIG. 2. The circuit in FIG. 2 includes a NOR gate 123 with a plurality of input terminals. In the present embodiment there are twelve input terminals, one identified by reference numeral 75 as being the output terminal of the coincidence circuit 46 in FIG. 1, and ten more which are the output terminals of the remaining coincidence circuits 47—56. The twelfth input terminal 124 is connected to one output terminal 125 of a flip-flop 126.

The output of the NOR gate 123 with its inverter is connected to one input terminal 128 of the second NOR gate 127 which has a second input terminal 129 connected to a terminal 130, which is also shown in FIG. 1. As may be seen there, the terminal 129 is connected through a normally-open switch 131 to a positive voltage source having a value of 3.6 volts, which corresponds to the "high" or 1 signal from the various flip-flops in FIG. 1.

The output of the NOR gate 127 is connected through an amplifier and inverter 132 to the setting terminal 133 of a flip-flop 134. The flip-flop 134 has two output terminals 135 and 136 which are the converse of each other; i.e. when the output voltage at the terminal 135 is high, the output voltage at the output terminal 136 is low, and vice versa. The flip-flop 134 has a reset terminal 137.

The terminal 135 is connected to one input terminal 138 of a NOR gate 139, while the output terminal 136 is connected to the input terminal 142 of a NOR gate 144. The NOR gate 139 has two additional input terminals 146 and 147, one of which is connected to the output terminal 125 of the flip-flop 126. An amplifier and inverter 148, which is energized from a source 149 by a signal that corresponds in duration to the interval to be compared with the standard interval, is connected to the input terminal 147. The source 149 is also connected to a second input terminal 150 of the NOR gate 144, and the latter has a third input terminal 151 connected to the output terminal 125 of the flip-flop 126. The output terminals of the NOR gates 139 and 144 are connected to input terminals 152 and 153 of another NOR gate 154, which has an output terminal 155 connected to the base input terminal of the transistor 110 in FIG. 1.

The output terminal 135 of the flip-flop 134 is also connected to an input terminal 156 of a NOR gate 157. A source 158 is connected through an amplifier and inverter 159 to a second input terminal 160 of the NOR gate 157 and the output terminal 161 of the NOR gate is connected to the reset terminal 173 of the flip-flop 126.

The operation of the circuit in FIG. 2 will be described in conjunction with the voltage waveforms shown in FIG. 3, and to give a more concrete interpretation to both the circuit and the waveforms it will be assumed that the circuit is used in conjunction with a standard injection molding machine (not shown) that has a piston which slides back and forth between two limit positions. When the piston slides forward it pushes a quantity of material to be molded into a die and, after having done so, it returns to its starting point to pick up a new quantity of the material. For a given type of material and a given die configuration the speed that the piston moves forward is determined by certain conditions such as the fluidity of the material and the ability of the dies to receive it. There may be other conditions that also effect the speed of forward movement of the piston, but in general as long as the molding process is proceeding satisfactorily each forward piston stroke will take about the same length of time. By measuring the length of time that a forward stroke takes, a determination may be made as to whether the resultant molded product is likely to be satisfactory or not.

In order to get the necessary determination of stroke speed, any suitable means, such as a pair of microswitches, may be placed alongside the piston to be actuated as it moves forward. One convenient way of connecting the switches is to cause them to produce a short voltage impulse at the instant they are actuated by the piston. For example, the voltage waveform 162 in FIG. 3 may be chosen to represent the actuation of a switch shortly after the beginning of piston stroke for each of three successive strokes. The voltage waveform 16 corresponds to the actuation of a second switch near the end of the stroke for each of three successive strokes, and the time between each of the pulses 162, for example pulse 162a, and the succeeding pulse from the waveform 163, which is pulse 163b, represents the time that it takes the piston to move forward. When the machine is operating satisfactorily the time interval between the pulse 162a and the pulse 163b will be relatively constant for a large number of strokes. As conditions in the molding process vary, the interval between a starting pulse 162 and a terminating pulse 163 may either lengthen or decrease.

A third pulse wave 164 is formed by the source 149 and is controlled by the pulses 162 and 163 so that the pulses 164 are low, or in the 0 condition, during the timed part of the forward stroke of the piston and high, or in the 1 condition from the end of the measurement of each forward stroke until the beginning of the measurement of the next forward stroke. The pulse wave 165 is simply the converse of the pulse wave 164.

While the machine is operating satisfactorily as determined by examination of the molded products, a standard interval is memorized by momentarily causing the switch 131 in FIG. 1 to drive the terminal 130, which appears in both FIG. 1 and 2, high. The signal at terminal 130 is indicated by reference numeral 166 and is high for a period starting between the pulses 163a and 162a and ending between the pulses 162a and 163b. The exact timing and duration of the high signal 166 is not material and in fact it could last for a total time greater than several complete strokes of the machine. It could also start and end at any point in any cycle of operation of the machine.

The pulse 166 is applied to the setting input terminal 167 of the flip-flop 126. This setting pulse causes the output terminal 125 to go high, as shown by the waveform 170 and apply a false noncoincidence signal to the input terminal 124 of the NOR gate 123. As a result, no matter what signals are applied to the other terminals 75, the output of the NOR gate 123 will remain low until the end of the measurement of the standard interval.

The signal 166 also applies a high input via the terminal 129 to the NOR gate 127 which, at this time, is receiving a low input from the NOR gate 123. The high input from the signal 166 causes the output of the NOR gate 127 to be low, producing an output signal 168 which is low for the duration of signal 166, as well as the duration of the high pulses 164, as will be described later. The signal 168 is inverted by the inverter 132 to produce a high pulse signal 169, which is applied to the setting terminal 133 of the flip-flop 134. This causes the terminal 135 to go high and it remains high until the flip-flop is reset by the next pulse 162 applied to the terminal 137 after the end of the signal 166. This is the pulse 162b.

As long as the signal at the terminal 135 remains high, the output of the NOR gate 157 will remain low. The signal applied to the other input terminal 160 of the NOR gate is the pulse signal 163 inverted by the inverter 159 so that it is high except for the short duration of the pulses. However, as soon as the output of the NOR gate starts to go high due to the pulse 163c that denotes the end of the standard interval, the flip-flop 126 is reset and its output terminal 125 goes low, as shown in waveform 170, which permits the output of the NOR gate 123 to go high and drive the output of the NOR gate 127 low. This signal in turn is inverted by the inverter 132 to set the flip-flop 134 and cause its output terminal 135 to go high and thus to drive the output of the NOR gate 157 low. As a result, the output of the NOR gate 157 may stay high for an interval of time much shorter than the pulse 163c, as shown by the waveform 171.

During the time the signal 170 makes the terminal 125 high, both of the input terminals 146 and 151 to the NOR gates 139 and 144, respectively, are high and their outputs are low. These outputs applied to the input terminals 152 and 153 of the NOR gate 154 cause the output terminal 155 of the latter to be high. This terminal, as may be seen in FIG. 1, is connected to the base input electrode of the transistor 110 and maintains this transistor in a conductive state, thereby effectively short circuiting the line 112 to the common terminal 111. This prevents any voltage buildup on the capacitors 77—87 during the measurement of the standard interval.

The flip-flop 126 has an additional output terminal 180 that is the converse of the terminal 125. This terminal is shown in FIG. 1 as the output terminal of the source 29 which is connected to the NOR gate 28. The effect of the signal applied from the terminal 180 is to permit the pulses 14 to pass through the NOR gate 28 only when a standard interval is being recorded. It will be recalled that these pulses are produced by the oscillator 11. This oscillator is controlled by the signal 172 shown in FIG. 3 so that the pulses are generated only when that signal is low. This means that pulses are transmitted through the NOR gate 28 only during the standard interval of time and are applied to the storage register 32. Each pulse toggles the first flip-flop 33, and alternate pulses toggle the next flip-flop and so on down the line.

At the same time the same pulses 14 are applied to the counter-timer 16 to actuate it in the same way. As long as the standard interval is being recorded, each of the flip-flops in the counter-timer is coincident with a corresponding flip-flop in the storage register. To be specific, this means that when the standard interval is being measured the output terminal 59 of the flip-flop 17 is in the 1 condition and that when the terminal 59 reverses to the 0 condition the terminal 62 also reverses to the 0 condition.

After the NOR gate 28 has been held open until the end of the standard interval, it is closed and thereafter no pulses can be applied to the storage register until the switch 131 is closed to measure a new standard interval. This means that whatever condition is present on the flip-flops 33—43 of the storage register 32 will remain, to serve as a standard of comparison during the measurement of subsequent intervals. On the other hand each of the flip-flops 17—27 in the counter-timers 15 is returned to an initial condition each time one of the pulses in the waveform 162 comes along. These pulses are applied by way of a NOR gate 174 and a inverter 175 to the reset terminal of each flip-flop in the counter-timer. This causes the counter-timer to begin a new count from the same initial condition at the occurrence of each of the pulses 162.

As the counter-timer counts the pulses 164 during the interval following each of the pulses 162 and continues until the next succeeding pulse 163, the flip-flops 17—27 go through states of coincidence and noncoincidence with respect to the corresponding flip-flops 33—43 of the storage register 32. By analyzing whether there is coincidence or not, it is possible to determine whether the same time has elapsed that was required to establish the condition of the flip-flops 33—43 during the standard interval. If, at a succeeding interval of time, each of the flip-flops 17—27 reaches a state in which it is coincident with each of the flip-flops 33—43, the same time must have elapsed in measuring the subsequent interval as in measuring the standard interval.

The state of coincidence is identified by the coincidence circuits 46—56, and the possibility of coincidence and noncoincidence are identified in the following truth table for the two flip-flops 17 and 33 and the coincidence circuit 46.

| Terminal: | Coincidence "1" | Non-Coincidence "1" | Coincidence "0" | Non-Coincidence "0" |
|---|---|---|---|---|
| 59 | 1 | 0 | 0 | 1 |
| 60 | 0 | 1 | 1 | 0 |
| 65 | 0 | 1 | 1 | 0 |
| 66 | 0 | 0 | 1 | 1 |
| 72 | 1 | 0 | 0 | 0 |
| 71 | 1 | 0 | 0 | 0 |
| 75 | 0 | 1 | 0 | 1 |
| 73 | 0 | 0 | 1 | 0 |
| 74 | 0 | 0 | 1 | 0 |
| 68 | 1 | 0 | 0 | 1 |
| 69 | 1 | 1 | 0 | 0 |
| 62 | 1 | 1 | 0 | 0 |
| 63 | 0 | 0 | 1 | 1 |

In this table the condition identified as Coincidence "1" has been defined as that condition in which both upper terminals 59 and 62 are high, or in the 1 condition, and Coincidence "0" as that condition in which both upper terminals are low, or in the 0 condition. Noncoincidence 1 has been defined as that condition in which the terminal 59 is 0 and terminal 62 is 1 and the converse condition, Noncoincidence 0, as that condition in which the terminal 59 is 1 and the terminal 62 is 0.

At the start of each subsequent interval of time following the standard interval some or all of the flip-flops 17—27 will be noncoincident with corresponding flip-flops 33—43, and until sufficient time has elapsed during the subsequent interval to allow all of the flip-flops 17—27 to reach a state of coincidence with the flip-flops 33—43, there will always be at least one flip-flop of the counter-timer 16 that is not coincident with the corresponding flip-flop of the storage register 32. Noncoincidence of any pair of flip-flops results in a high signal at the output terminal 75 that corresponds to that pair. Thus, until complete coincidence is reached, at least one of the inputs to the NOR gate 123 will be high and the condition of the setting input terminal 133 of the flip-flop 134 will be low.

Initiation of the measurement of each subsequent interval of time not only starts the counting operation of the counter-timer 16 but also is accompanied by the occurrence of one of the pulses 162 at the reset terminal 137 of the flip-flop 134 to cause the terminal 135 to go low and the terminal 136 to go high. The flip-flop 134 remains in this condition until there is complete coincidence between the counter-timer 16 and the storage register 33. At that instant all of the input terminals of the NOR gate 123 go low. This results in transmitting a high signal to the setting terminal 133 to reverse the condition in the flip-flop 134 and drive the output terminal 135 high and the terminal 136 low.

During the measurement of the time required to reach coincidence, which, by definition, is identical with the time recorded in the storage register, the input terminal 138 of the NOR gate 139 is low and the input terminal 142 of the NOR gate 144 is high. As long as any input to the NOR gate 144 is high, the output of the NOR gate, which is applied to the input terminal 153 of the NOR gate 154 will be low.

At the same time the flip-flop 134 is reset by one of the pulse 162, the signal 164 is applied by way of the source 149 to the input terminal 150 of the NOR gate 144 and an inverted signal 165 is applied to the input terminal 147 of the NOR gate 139. This inverted signal 165 is high at the start of a subsequent interval of time, which causes the output of the NOR gate 139 to be low during the initial part of the subsequent interval. This causes the input terminal 152 to be low initially, and since the input terminal 153 is also low, the output terminal 155 of the NOR gate 154 is high, which is the condition required to maintain the transistor 110 in FIG. 1 conductive. If the length of the subsequent interval of time is exactly the same as the standard interval, the end of the low portion of waveform 164 will occur simultaneously with the establishment of coincidence between the counter-timer 16 and the storage register 32. As a result the signal applied to the input terminal 160 of the NOR gate 144 will go from low to high exactly simultaneously with the change of the signal at the input terminal 142 from high to low, and the output signal of the NOR gate 144 will remain low. Conversely, the signal applied to the input terminal 147 will go from high to low at the same time that the signal applied to the terminal 138 goes from low to high, and the NOR gate 139 will therefore also continue to apply a low signal to the input terminal 152. This means that the terminal 155 will remain high as long as each subsequent interval of time is of the same duration as the standard interval.

If a subsequent interval of time is shorter than the standard interval, the signal 164 and its inverse signal 165 will reverse polarity before coincidence is reached. This means that the signal applied to the input terminal 150 will go from low to high while the signal applied to the input terminal 142 remains high. Thus, at the instant of transition, there will be no change in the NOR gate 144, and it will continue to supply a low signal to the input terminal 153. The reversal in polarity of the signal 165 applied to the input terminal 147 will cause that terminal to go from high to low while the signal applied to the input terminal 138 is still low. This means that at the instant of transition all of the input terminals to the NOR gate 139 will be low and therefore the output terminal of this NOR gate will be high and will apply a high signal to the input terminal 152. This high signal will cause the output terminal 155 to go low and drive the transistor 110 nonconductive.

As described previously, the capacitors 77—87 are effectively in parallel and are related in binary terms. That is the capacitance of the capacitor 78 is twice as large as the capacitor 77 and the capacitance of the capacitor 79 is four times as large as that of capacitor 77, and so on. This corresponds to the fact that it takes twice as many pulses 14 to reverse the polarity of the flip-flop 34 as it does to reverse the polarity of the flip-flop 33. Whether or not the output terminal 62 of the flip-flop 33 is in a high or low state depends upon the number of pulses that have been recorded in the storage register, and the same thing is true of each of the other flip-flops 34—43. Some of these flip-flops will be in one condition of conduction and others may be in the reverse condition. If the terminal 62 is high, the transistor 88 will be conductive and the capacitor 77 will be part of the charging circuit. The same thing is true of each of the other capacitors 78—87 for which the corresponding transistors 89—98 are conductive. As a result the time constant of the charging circuit will have a specific relationship to the standard interval of time and this relationship will change in a binary manner with the length of the standard interval. Thus for a longer standard interval the time constant will be larger than for a shorter standard interval. A larger time constant means that the time required for the active capacitors to charge to the trigger voltage level of the transistors 111 and 112 will be longer in proportion to the length of the standard interval.

The waveforms associated with a subsequent interval of time shorter than the standard interval are shown in FIG. 3. The first waveform 176 corresponds to the waveform 164 and is the signal applied to the input terminal 150 of the NOR gate 144 in FIG. 2. As has been explained, the output terminal 155 of the NOR gate z54 goes low at the end of a subsequent interval of time, here identified as the low portion 176a of the waveform 176, unless the signal 172 goes high at the same time. Since that is not the case for a shorter-than-standard interval, a signal having a waveform 177 is produced in the output terminal 155. This signal has a low portion 177a that begins at the end of the short interval of time 176a and continues until the signal 172 goes high, which occurs when all of the flip-flops 17—27 in the counter-timer 16 become coincident with the flip-flops 33—43 in the storage register 32. The low signal 177a makes the transistor 110 nonconductive and allows voltage to build up across the operative capacitors 77— 87 to form a sawtooth signal 178 as shown in FIG. 3. As this voltage crosses the trigger voltage, indicated by the level 179, a short pulse 181 will be formed across the load impedance 117.

The operation of the system is much the same if the subsequent interval of time is longer than the standard interval. In that case the waveform applied to the input terminal 150 of the NOR gate 144 would be as shown in FIG. 3 by reference numeral 182. This waveform has a low portion 182a that lasts longer than the standard interval. Hence at the end of the standard interval when the flip-flops 17—27 become coincident with the flip-flops 33—43, the output terminal 155 will be forced to go low and to stay that way until the end of the low interval 182a. This will produce a signal 183 with a low portion 183a that operates to turn off the transistor 110 and allow voltage to build up across the capacitors 77—87. If the length of the interval 183a is longer than is permissible, the sawtooth voltage 183 built up across the operative capacitors 77—87 will exceed the trigger level 179 and produce another pulse 181a across the load impedance 117.

The only difference between the pulses 181 and 181a is in the interval during which each can occur. The pulse 181 can occur only prior to coincidence between all the output terminals 75 because the subsequent interval is too short, while the pulse 181a can occur only after coincidence has been reached because the subsequent interval is too long.

The apparatus in FIGS. 2 and 4 includes components to make use of the pulses 181 and 181a to produce a visual, or, if necessary, an automatic, indication that the subsequent interval of time is not within the tolerance set by the trigger level of the transistors 115 and 116. In FIG. 2 these components include a NOR gate 186 having one input terminal 187 connected to the output terminal 185 and another input terminal 188 and an output terminal 189. The signal across the load impedance 117 in FIG. 1 is connected by way of an output terminal 190 and an inverter 191 to the input terminal 188. A second NOR gate 193 has an input terminal 194 connected to the output terminal 136 of the flip-flop 134 and another input terminal 195 connected to the output terminal of the inverter 191. The NOR gate 193 has an output terminal 196.

In operation, a pulse 181 (or 181a) will be generated across the impedance 117 only if the subsequent interval of time is either longer or shorter than the standard interval by more than a predetermined percentage of that standard interval, for example, 10 percent. This positive pulse is inverted in the inverter 191 and applied, whenever it occurs, to the input terminals 188 and 196 as a short, low signal. Except during the short interval represented by the pulse 181, the input terminal, 188 and 196 will be high and therefore the output terminals 189 and 196 of the NOR gates 186 and 193, respectively, will be low. In addition, until the end of a period equivalent to the standard interval the output terminal 136, and therefore the input terminal 194, will also be high so that the output terminal 196 of the NOR gate 193 cannot go high until after the measurement of an interval equivalent to the standard interval.

At the end of an interval equivalent to the standard interval the signals applied to the input terminals 187 and 194 reverse, and thereafter a low signal applied in the form of an instantaneous pulse to the input terminal 188 and 196 could affect the output of the NOR gate 193 but not the output of the NOR gate 186.

FIG. 4 shows additional circuitry for utilizing the signal developed at the output terminals 189 and 196 of the NOR gates 186 and 193. As may be seen, the output terminal 189 is connected to the gate electrode of a silicon-controlled rectifier, or SCR 201, which has its anode and cathode electrodes connected in series with an indicator light 202. The output terminal 196 is connected to the gate electrode of a second SCR 203, which has its anode and cathode electrodes connected in series with another indicator light 204.

The light 202 is actuated when the pulse 181 occurs and causes a momentary high signal to be applied to the terminal thereby making the SCR 201 conductive. Since this occurs only when the subsequent interval is too short, the light 202 may be identified as the "Fast" light. The light 204 is actuated when the positive pulse 181a makes the SCR 203 conductive. This can only happen when the subsequent time interval is excessively long with respect to the standard interval, and thus the light 204 may be identified as the "Slow" light. In either case, once the SCR 201 or 203 is energized, it continues to be conductive until the current through it and through the light to which it is connected is interrupted. For this purpose a reset switch 206 is provided to interrupt both SCR circuits momentarily in order to allow the light that is on to go off.

As a somewhat redundant indication that the apparatus is working and that the measured time intervals are within permissible limits, a third light 208, identified as the "Go" light may also be provided. This light is connected in series with the emitter-collector circuit of a transistor 209. Current is supplied to the base of the transistor 209 by a series circuit comprising an impedance 211 and three diodes 212—214. At the junction between the impedance 211 and the diode 212 are two other diodes 216 and connected, respectively, to the SCR's 201 and 203.

As long as there is no indication that the time interval is either too short or too long, the light 208 is kept on by virtue of the fact that forward bias supplied by the impedance 211 and the diodes 212—214 keeps the transistor 209 conductive. However, if either of the SCR's 201 or 203 becomes conductive, it effectively connects the appropriate diodes 216 or 217 to ground and reduces the bias on the base of the transistor 209 below the conductive level. The conductive level is partly determined by the diodes 212—214 since there is a small voltage drop across each of them, and connecting either the diode 216 or 217 effectively to ground reduces the voltage level at the junction between the diode 212 and the impedance 211 below the level at which current can flow to the base of the transistor 209. As a result the light 208 will go off at the same time that either the light 202 or the light 204 goes on, and it will stay off until after the reset switch 206 has been opened and closed again.

After the apparatus has been in use for a while it may be that the machine being monitored will be switched to a different use. For example, if the machine is a molding machine, the dies may be changed or the type of material being molded may change, making it necessary to reestablish a new standard interval. This requires the information being retained in the storage register 32 in FIG. 1 to be erased, which may be done by momentarily closing the switch 131. The latter is connected through a buffer amplifier 219 to the reset terminals of all of the flip-flops 33—43. Closing the switch 129 also applies a high signal to the NOR gate 174, which causes the output of that gate to go low and therefore causes the output of the following inverter 175 to go high and to apply a high signal to the reset terminal 58 of the flip-flop 17 and similar reset terminals of all of the other flip-flops 18—27. The switch 129 thus erases any stored information on all of the flip-flops 17—27 and 33—43 and returns all of them to an initial condition. Each positive pulse of the signal 162 applied to the NOR gate 174 has the same effect of returning all of the flip-flops 17—27 to the 0 state, but it does not affect the setting of the flip-flops 33—43.

Instead of using a timing current with capacitors such as the capacitors 77—87 in FIG. 1 to generate the pulses 181 and 181a, another counter and another coincidence circuit can be connected to the storage register 32 of FIG. 1. The connection may be as shown in FIG. 5 in which the storage register 32 may be reproduced from FIG. 1. Another counter circuit 220 comprising a series of flip-flops 221—231 identical with the flip-flops 33—43 is connected to a series of coincidence circuits 235—245 in exactly the same way that the counter circuits 46—56 of FIG. 1. The actual components in the coincidence circuits 235—245 may also be identical with the components shown in the coincidence circuit 46 of FIG. 1. The storage register 32 is connected to the coincidence circuit 235—245 in the same way that it is connected to the coincidence circuits 46—56. Each of the coincidence circuits 235—245 has an output terminal 248—258. All of these output terminals are connected to corresponding input terminals of a NOR gate 261, but the only connection which has been completed in the drawing is that from the output terminal 258 to one of the input terminals of the NOR gate 261. The NOR gate 261 has an output terminal 262. The counter 220 is controlled by a pulse oscillator 263 which, in turn, is controlled by a gate circuit 264 that receives a signal from the output terminal 155 of the NOR gate 154 in FIG. 2.

The operation of the circuit in FIG. 5 is such that the gate 264 is closed except when the signal applied to the input terminal 155 is low. This low signal is either the signal 177a or the signal 183a shown in FIG. 3, and the application of the low signal to the gate 264 removes the inhibiting effect of the gate and permits the oscillator 263 to generate a train of pulses 265. These pulses may be like the pulses 14 in FIG. 1 except for having a much higher repetition rate, for example, 10 times as high as the repetition rate of the pulses 14.

The application of these pulses to the other counting circuit 220 causes the flip-flops 221—231 to be actuated in the same stepping succession as the flip-flops 33—43 were during the initial recording of the standard interval. Because of the high repetition rate of the pulses 265 the flip-flops 221— 231 can reach coincidence with the flip-flops 33—43 in a much shorter time than the time required for coincidence between the flip-flops 17—27 in FIG. 1 and the flip-flops 33—43. In fact, if the repetition rate of the pulses 265 is 10 times as great as the repetition rate of the pulses 14, the flip-flops 221—231 will reach coincidence in one-tenth the time. In general the time required to reach coincidence is 1/Nth, where N is the ratio between the repetition rate of the pulses 265 and the pulses 14.

If the duration of the low signal applied to the terminal 155 is sufficiently long to permit all of the flip-flops 221—231 to reach a state of coincidence with the flip-flops 33—43, all of the output terminals 248—258 of the coincidence circuits 235—245 will go low, indicating that coincidence has been reached. Until coincidence, at least one of these output terminals will be high and will cause the output of the NOR gate 261 to be low. The occurrence of a high pulse at the terminal 262 will be equivalent to the occurrence of either the pulse 181 or 181a of FIG. 3, and will represent the fact that the discrepancy between the length of the subsequent interval and the standard interval is greater than the tolerance, the tolerance being that fraction of the standard interval represented by the ratio of the repetition frequency of the pulses 14 to the pulses 265. If the flip-flops 221—231 continue to count beyond the point at which coincidence is reached, at least one of the output terminals 248—258 will go high again, driving the output of the NOR gate 261 low. Thus, coincidence will be indicated by the presence of only a single relatively short pulse, the duration of which is equal to the duration of the time between two successive ones of the pulses 265.

I claim:

1. A timer comprising:
    a. recording means to record a standard interval of time;
    b. measuring means to measure a subsequent interval of time;
    c. comparison means connected to said first and second means to compare said subsequent interval to said standard interval;
    d. first signal-generating means to generate a first signal following the beginning of said subsequent interval by an interval of time substantially equal to said standard interval;
    e. second signal-generating means to generate a second signal corresponding to the end of said subsequent interval; and
    f. discrepancy measuring means connected to said recording means and said first and second signal-generating means to measure the interval of time between said first and second signals as a percentage of said standard interval.

2. The timer of claim 1 in which said recording means comprises a digital storage register.

3. The timer of claim 2 in which said storage register comprises a series of electronic flip-flop circuits for storing information as to the duration of said standard interval in terms of electrical conditions of said flip-flops.

4. The timer of claim 1 in which both of said recording means and said measuring means comprise bistable circuits to store information in digitally related voltage form.

5. The timer of claim 1 comprising, in addition: a source of pulses and circuit means connecting said source of pulses to said recording means and to said measuring means; and control means to cause said source of pulses to supply pulses to said recording means during said standard interval of time and to apply said pulses to said measuring means during said subsequent interval of time.

6. The timer of claim 5 in which said connecting means from said source of pulses to said recording means comprises from said source of pulses to said recording means comprises a gate circuit to permit said pulses to reach said recording means only while said standard interval of time is being recorded.

7. The timer of claim 5 comprising, in addition: a second gate circuit; means to generate a control signal having a duration equal to said standard interval; means connecting said last-named means to said second gate circuit to control the operation of said second gate circuit to open said gate for a period of time equal to said standard interval; and means connecting said second gate circuit to said source of pulses to permit said pulses to be generated only during periods of time substantially equal to said standard interval.

8. The timer of claim 1 in which said recording means and said measuring means each comprises a series of electronic flip-flop circuits, each having a "O" condition and a "1" condition, and said comparison means comprises electronic logic circuits connected to corresponding flip-flops of said recording means and said measuring means to indicate by a voltage output condition whether both of the flip-flops connected to a particular comparison means are in the "0" condition or the "1" condition or whether one is in the "0" condition and the other is in the "1" condition.

9. In the timer of claim 8 a timing circuit comprising a plurality of capacitors arranged in sequency whereby the capacitance of the second capacitor in said sequence is twice as great as the capacitance of the first capacitor, the capacitance of the third capacitor in said sequence is twice as great as the capacitance of the capacitance of the second capacitor, and the capacitance of each subsequent capacitor in said sequence is twice as great as the capacitance of the capacitor immediately preceding it in said sequence, a plurality of transistors, each of said transistors connected in series with a respective one of said capacitors to form therewith a separate series charging circuit, and a connection between between the input circuit of each of said transistors and a respective one of said flip-flops in said storage register, whereby each of said transistors in conductive when the flip-flop to which it is connected is in its "1" condition and is nonconductive when the flip-flop to which it is connected is in its "0" condition, whereby each of said capacitors connected to conductive ones of said transistors are in parallel in said timing circuit, whereby the time constant of said timing circuit is proportional to the duration of said standard interval.

10. The timer of claim 9 comprising, in addition: a clamping transistor connected in parallel with each of said series circuits and comprising an input circuit; means to generate a pulse signal corresponding in duration to the discrepancy between said standard interval and a subsequent interval; and a connection from said last-named means to said input circuit of said clamping transistor to render said clamping transistor nonconductive for the duration of said discrepancy interval.

11. In the timer of claim 8, a timing circuit comprising: a third series of electronic flip-flop circuits, each having a "0" condition and a "1" condition, a series of comparison logic circuits, each connected to one flip-flop circuit of said third series and to a corresponding flip-flop circuit of said recording means to indicate by a voltage output condition whether both of the flip-flops connected to a particular comparison circuit are in the "0" condition or the "1" condition or whether one is in the "0" condition and the other in the "1" condition; a relatively high frequency pulse source having a repetition rate N times as great as the repetition rate of pulses of said first-named source; means to control the application of high frequency pulses from said high frequency source to said third series of flip-flop circuits; and means to indicate coincidence between all of the flip-flop circuits; and means to indicate coincidence between in said third series and all of the flip-flop circuits in said recording means.